UNITED STATES PATENT OFFICE.

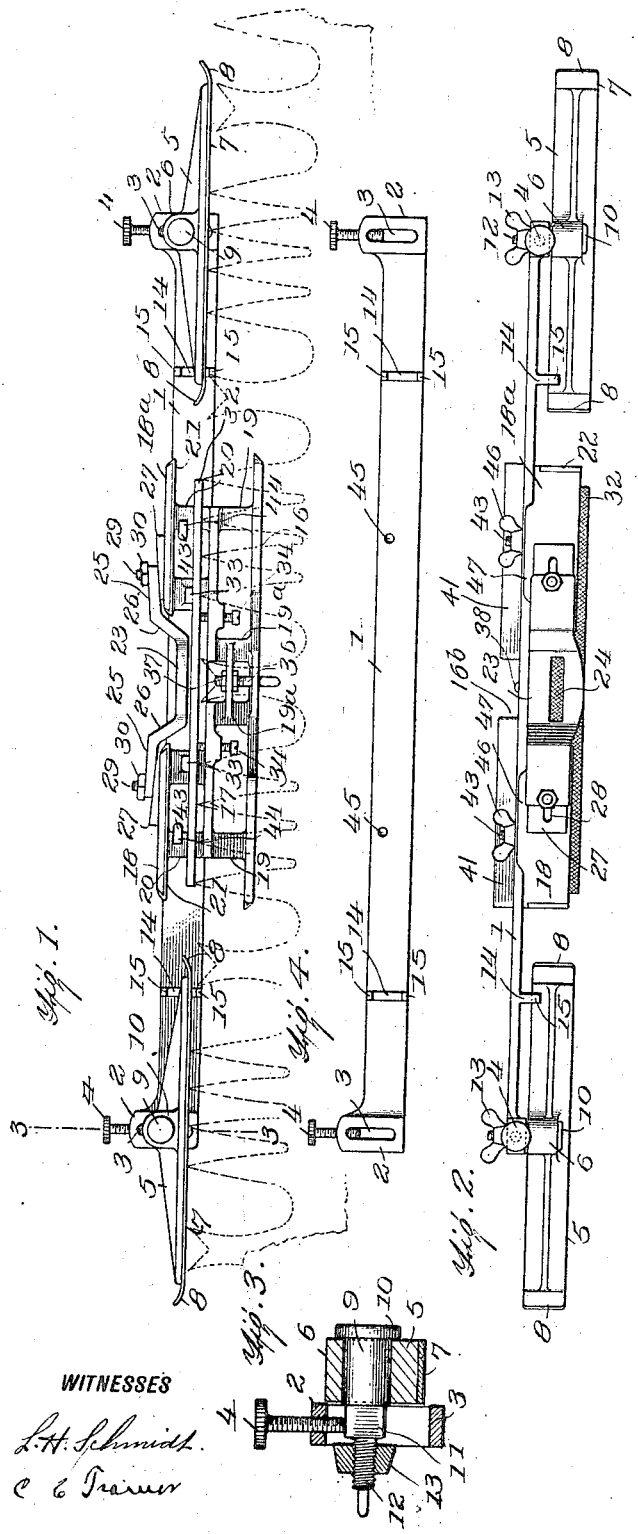

WILLIAM E. GIBBS, OF OAK POINT, WASHINGTON.

SAW-JOINTER.

1,237,892.  Specification of Letters Patent.  Patented Aug. 21, 1917.

Application filed December 16, 1913, Serial No. 807,007. Renewed March 9, 1917. Serial No. 153,738.

*To all whom it may concern:*

Be it known that I, WILLIAM E. GIBBS, a citizen of the United States, and a resident of Oak Point, in the county of Cowlitz and State of Washington, have made certain new and useful Improvements in Saw-Jointers, of which the following is a specification.

My invention is an improvement in saw jointers, and has for its object to provide a tool of the character specified, adapted for use in connection with saws, and having means for permitting the saws to be jointed.

In the drawings:

Figure 1 is a front view of the improved tool,

Fig. 2 is a top plan view,

Fig. 3 is a section on the line 3—3 of Fig. 1, and

Fig. 4 is a front view of the frame or supporting bar.

The present embodiment of the invention consists of a frame or supporting bar 1 of suitable size and length, and having each of its ends enlarged laterally at the top of the bar, to form a head 2, and each head is slotted, as shown at 3, transversely of the bar. A set screw 4 is threaded through each head into the slot, and a runner or guide plate is connected with each head.

Each of the runners or heads 5 has a central bearing 6, and one face of each of the said runners is plane and straight, and a smooth faced hardened steel plate 7 is secured to the said face of each runner. The plate 7 extends longitudinally of the runner, and the ends of each of the plates are bent upwardly, as shown at 8, to prevent their engagement with the teeth of the saw.

A journal pin 9 is held in the bearing of each runner, the said pin having a head 10 at one end and having the other end reduced, and flattened, from side to side, as shown at 11, to engage the slot 3 of the adjacent head of the frame bar. Beyond the reduced portion 11 of the journal pin the said pin is again reduced and threaded, as shown at 12, and a wing nut 13 is threaded onto the portion 12. It will be evident from the description that when the nuts 13 are loosened, the runners may be adjusted laterally with respect to the frame bar. When in adjusted position, the nut 13 is tightened, and the set screw 4 is turned until the end thereof engages the reduced portion 11 of the journal pin. When so engaged, the set screw absolutely prevents upward movement of the runner. The portion 11 of each journal pin is of a width to engage the slot 3, and it will be noticed that the portion 9 of the journal pin is of greater length than the width of the runner, so that the runner may swing on the journal pins whatever the adjustment. The runner may thus be adjusted with respect to the frame bar, without clamping the runner to the frame bar to an extent where it cannot swing with respect to the frame bar.

The frame bar is provided near each end with means for limiting the swinging movement of the adjacent runner. The said means comprises a transverse rib 14 having at each end a lug 15 extending laterally with respect to the frame bar. The inner end of each runner is engaged between the lugs 15 of the adjacent rib, and it will be evident that the said lugs will limit the swinging movement of the runner.

The swaging mechanism comprises a bracket consisting of three plates, 16, 17—17$^a$, 18—18$^a$, the latter plates being sectional. The sections 17—17$^a$ are connected with the plate 16 by means of integral connections 19—19$^a$, while the sectional plate 17—17$^a$ is connected to the plate 18—18$^a$ by means of integral connections 20 and 20$^a$. The sections of the plates 17—17$^a$ are in the same plane, and the sections of the plate 18—18$^a$ are in the same plane and in a plane parallel to the plane of the plate 16 and 17—17$^a$, and the three plates are arranged in spaced relation.

The inner or under face of each section of the plate 18—18$^a$ is provided with a hardened facing plate 21, and the ends of the said facing plates are secured to the plate sections 18—18$^a$ by soldering or brazing the ends of the said spacing plates over the beveled ends of the plate sections. The gage plate is arranged between the sections of the plate 18—18$^a$. The said plate comprises a body 23 having a longitudinal slot 24, and having arms 25 offset laterally, from the body, and connected to the body by inclined portions 26.

The under faces of the arms 25 are beveled or inclined, as shown, and the gage plate is arranged with the body 23 between the meeting ends of the sections 18—18$^a$, and with the arms 25 above the upper faces of the sections. A wedge 27 is arranged between each arm 25 and the adjacent face of the adjacent section 18 or 18ᵃ, and each wedge is longitudinally slotted, as shown at 28. Each of the sections of the plate 18—18ᵃ is provided with a threaded stem 29 extending through the slot of the adjacent wedge and through a notch 30 in the adjacent arm 25, and each stem is engaged by a nut 31 to hold the parts in place.

By moving the wedges longitudinally toward or from the body of the gage plate, the said body may be adjusted with respect to the engaging faces of the sections of the plate 18—18ᵃ, and when adjusted to proper position, the parts may be clamped by means of the nuts 31. The file 32 is held between lugs 33 on the connections 20ᵃ and set screws 34 threaded through bosses 35 at the inner ends of the sections of the plates 17—17ᵃ. The lugs 33 engage the upper face of the file, while the set screws 34 engage the lower face. The file is thus clamped between the lugs and the set screws.

The gage pin 36 has a threaded portion 37, which passes through an opening in the holding plate integral with the connections 19—19ᵃ before mentioned, and nuts 40 are threaded on to the pin above and below the plate. By means of the nuts the pin may be adjusted to proper position. The swaging mechanism however, forms no part of the present mechanism and for this reason is not more fully described.

The operation of the improved tool is as follows:

When it is desired to joint a saw, the parts are arranged as shown in Fig. 1, the runners 5 being adjusted to proper position by means of the nuts 13 and the set screws 4. The device is arranged on the saw with the facing plates 7 touching the points of the teeth, and with the file 32 held as shown between the lugs 33 and the set screws 34. When the frame bar is moved along the saw, the file will dress the teeth that are too long, and the saw may be jointed in this manner.

The present invention is an improvement over the construction forming the subject matter of my co-pending application, Serial No. 614,836, filed March 16, 1911. It will be noted from an inspection of Fig. 2, that each section of plate 18—18ᵃ is provided with an extension 47 overlying the upper edge of the frame bar when the bracket is in place on the said bar.

It will be understood that the improved tool is particularly adapted for jointing those cross cut saws where the ends of the teeth are in the arc of a curve, and by means of the said tool any unevenness or ununiformness of the bevel may be corrected, in order that all of the points will be in the line of a perfect arc.

I claim:

1. In a device of the character specified, a frame bar provided at each end with a transverse slot, a runner having a straight edge for engaging the teeth of the saw and provided with a central bearing, a bolt passing through the bearing and having a reduced plain portion for engaging the slot of the frame bar and a reduced threaded portion beyond said plain portion, a nut threaded on to the said threaded portion, and a set screw threaded through the frame bar into the slot for engaging the plain portion of the bolt.

2. In a device of the character specified, a frame bar provided at each end with a transverse slot, a runner having a straight edge for engaging the teeth of the saw and provided with a central bearing, a bolt engaging the bearing and the slot for clamping the runner to the frame bar, and a set screw threaded through the frame bar at one end of the slot and engaging the said bolt.

3. In a device of the character specified, a frame bar, a runner at each end of the bar, each runner having a straight edge, means for permitting the runners to be adjusted laterally of the bar and to be fixed in adjusted position, the frame bar having lugs at its side edges and near each end for engagement by the inner ends of the runners to limit the swinging movement thereof with respect to the bar.

4. In a device of the character specified, a frame bar, a runner at each end of the bar, each runner having a straight edge, means for permitting the runners to be adjusted laterally of the bar and to be fixed in adjusted position, the frame bar having means adjacent to the inner end of each runner for limiting the swinging movement of the said end with respect to the frame bar.

WILLIAM E. GIBBS.

Witnesses:
GRACE M. BAKER,
MAX WHITTLESEY.

Copies of this patent may be obtained for five cents each, by addressing the "Commissioner of Patents, Washington, D. C."